United States Patent [19]

Melchior

[11] Patent Number: 5,209,197

[45] Date of Patent: May 11, 1993

[54] CYLINDER HEAD/CYLINDER SEALING DEVICE FOR A RECIPROCATING PRESSURIZED GAS MACHINE

[76] Inventor: Jean F. Melchior, 126 Bld Montparnasse, 75014 Paris, France

[21] Appl. No.: 849,040

[22] PCT Filed: Sep. 4, 1991

[86] PCT No.: PCT/FR91/00709

§ 371 Date: Apr. 24, 1992

§ 102(e) Date: Apr. 24, 1992

[87] PCT Pub. No.: WO92/04562

PCT Pub. Date: Mar. 19, 1992

[30] Foreign Application Priority Data

Sep. 6, 1990 [FR] France .............................. 90 11066

[51] Int. Cl.$^5$ ................................................ F02F 1/16
[52] U.S. Cl. .............................. 123/193.3; 123/193.2; 29/888.061
[58] Field of Search .................. 123/193.3, 193.2, 668, 123/669, 41.83, 41.84; 29/888.06, 888.061; 277/235 B; 92/171.1

[56] References Cited

U.S. PATENT DOCUMENTS

| | | | |
|---|---|---|---|
| 659,149 | 1/1928 | Lee | 123/193.3 |
| 2,721,542 | 10/1955 | Sheppard | |
| 4,244,330 | 1/1981 | Baugh et al. | 123/41.84 |
| 4,385,595 | 5/1983 | Shaw | 123/41.84 |
| 4,594,760 | 6/1986 | Dillard | 29/888.061 |
| 4,936,270 | 6/1990 | Ushio et al. | 123/193.2 |
| 5,097,807 | 3/1992 | Oikawa et al. | 123/668 |

Primary Examiner—E. Rollins Cross
Assistant Examiner—M. Macy
Attorney, Agent, or Firm—Larson and Taylor

[57] ABSTRACT

In a sealing device between a cylinder head (1) and a cylinder (2), formed by a removable thin cylindrical liner (7) sleeved into a bore provided in a cylinder block (4), when the cylinder head rests on the upper surface of the liner, before the cylinder head is clamped down, there remains between the cylinder head and the cylinder block an excess height (h) such that when the cylinder head is clamped down none of the materials of the cylinder head, the cylinder block or the liner, when compressed axially, reaches the limit of elastic deformation with a bearing force greater, given the thickness (e) of the liner (7), than the maximum force exerted by the gas pressure on the cylinder head (1) but sufficiently high for contact between the liner (7) and the cylinder head (1) to be maintained at all times during operation of the machine.

10 Claims, 4 Drawing Sheets

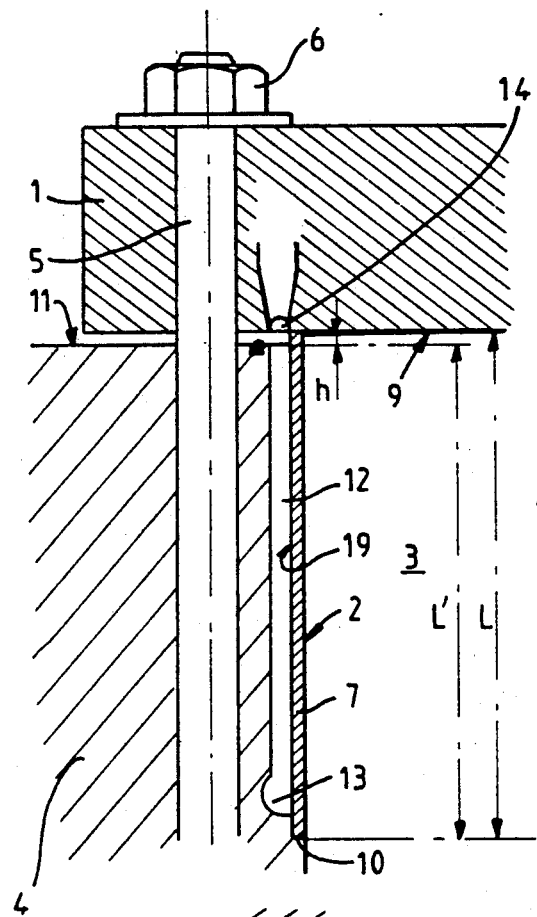
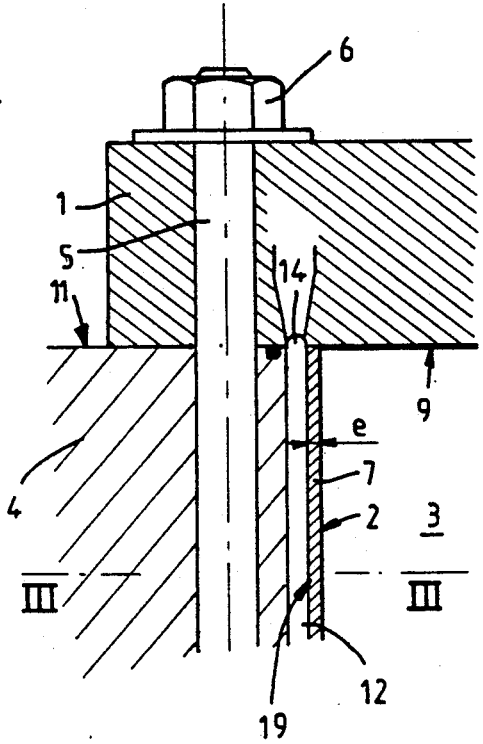

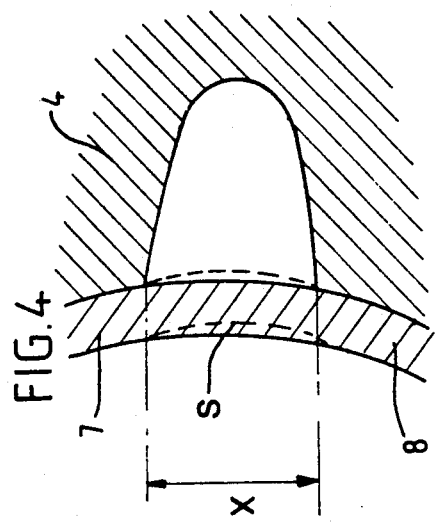
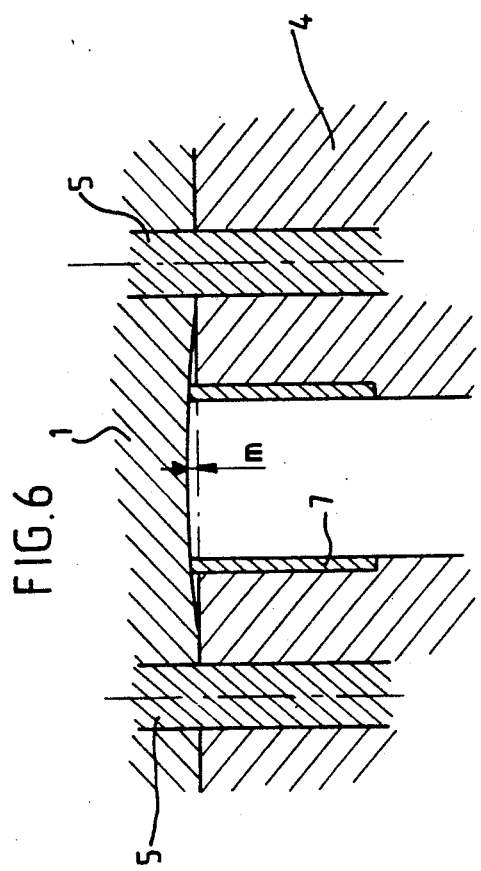
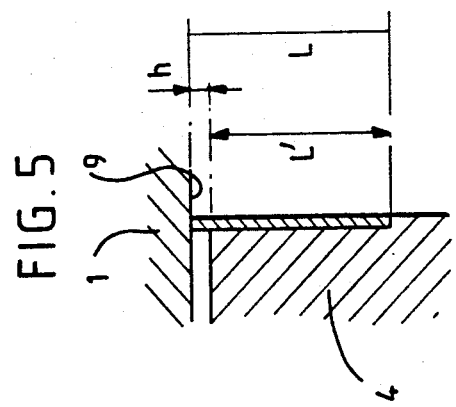

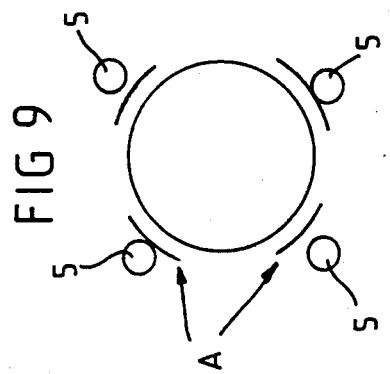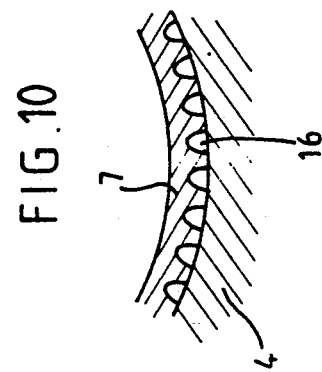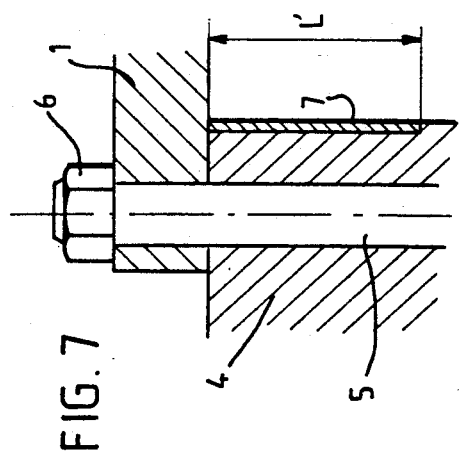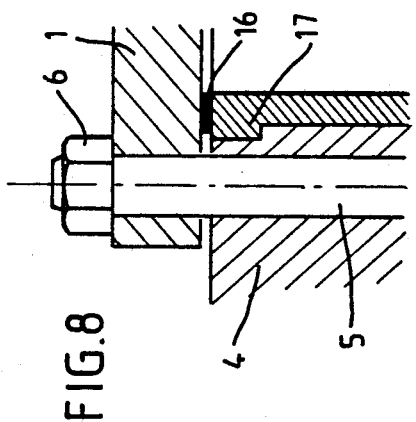

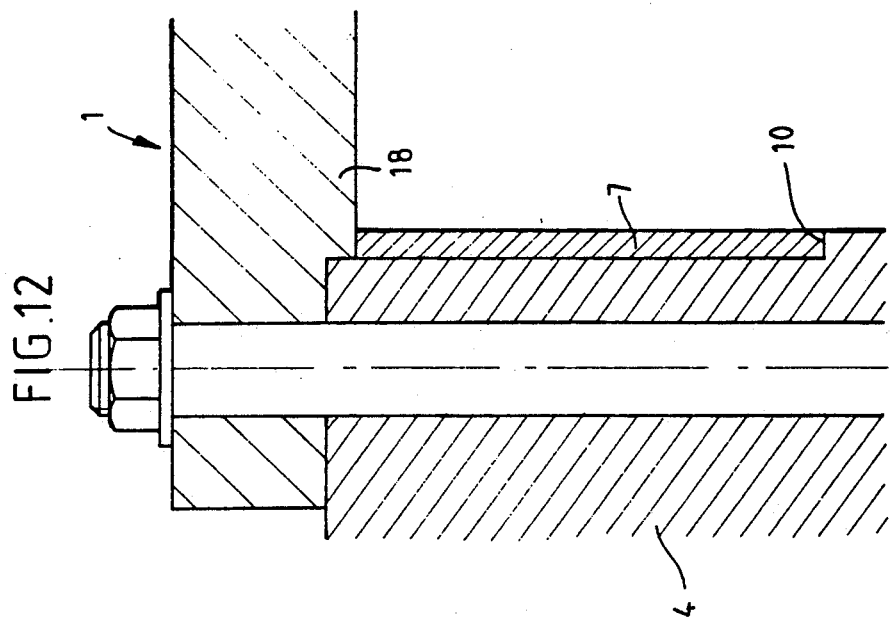
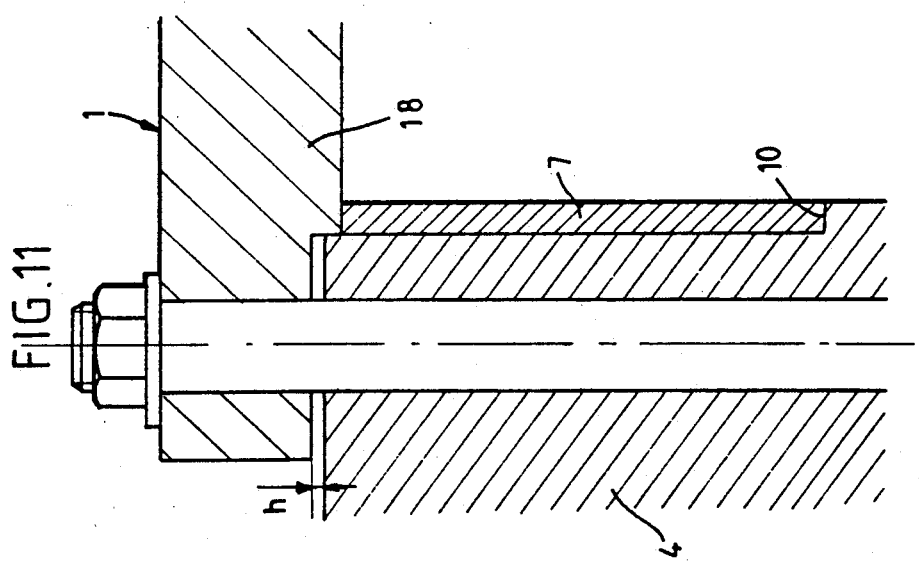

CYLINDER HEAD/CYLINDER SEALING DEVICE FOR A RECIPROCATING PRESSURIZED GAS MACHINE

The invention concerns a cylinder head/cylinder sealing device for a reciprocating pressurized gas machine in which the gas is contained in at least one variable volume working chamber delimited within a cylinder provided in an engine frame by a cylinder head clamped to the engine frame by means of studs in the latter and by a piston sliding with a reciprocating motion inside said cylinder which sealing device is formed by a removable cylindrical liner sleeved into a bore in said engine frame, the piston being provided with sealing rings in contact with the inside wall of the cylinder liner. In the present context the term "sealing rings" covers split rings and/or seals which are not split.

The invention relates more particularly, although not exclusively, to a sealing device for reciprocating internal combustion engines, the engine frame constituting what is known as a "cylinder block". They can be two-stroke or four-stroke, controlled or compression ignition and supercharged or unsupercharged engines.

The working or combustion chamber of a reciprocating internal combustion engine (or each such chamber) is generally delimited by:
a piston sliding in a cylinder formed in the cylinder block and carrying sealing rings;
the cylinder itself; and
the cylinder head clamped by studs to the upper surface of the cylinder block.

In older implementations the cylinder was usually a bore machined directly into the cylinder block. However, most modern implementations comprise a separate cylinder liner disposed between the piston and the cylinder block for reasons connected with maintenance and interchangeability.

There are known two types of cylinder liner for internal combustion engines, namely wet liners and dry liners. Such liners are distinguished from each other according to whether their exterior surface is or is not in direct contact with an engine cooling liquid.

Generally speaking, a wet cylinder liner is sufficiently thick to be able to withstand of its own accord the forces due to the pressure of the gas contained in the working chamber and comprises at one end a thick and relatively tall flange preventing any significant axial deformation and which is clamped between the bearing surface of the cylinder block and the cylinder head, as shown in FIG. 8 which will be explained in detail later, the liner being free to expand downwards independently of the cylinder block over the remainder of its length. A double water/air and air/oil seal is usually provided at the lower end of the liner (the end opposite the flange) in the form of O-rings accommodated in grooves machined into the liner. A pressurized gas seal is provided by a separate cylinder head gasket which is deformed irreversibly at the assembly by tightening the cylinder head studs.

A dry liner is too thin to withstand of its own accord the forces caused by the gas pressure. It is clamped into a bore machined into the cylinder block which thereby contains said forces. The cylinder block is cooled by a cooling liquid flowing in passages formed entirely within the cylinder block, the liner being cooled by conduction where it is in contact with the block. The pressurized gas seal is usually similar to that for a wet liner.

The above considerations remain valid, at least for the most part, for reciprocating pressurized gas machines other than internal combustion engines and in particular for compressors.

An object of the invention is to provide a new cylinder head/cylinder seal for a reciprocating pressurized gas machine.

Another object is to provide a sealing device which is adapted to withstand higher gas pressures able to generate greater cyclic deformations. In the case of liquid cooling, a further object is to improve the cooling effect by reducing the distance between the respective surfaces of the liner exposed to the cooling liquid and to the gas. By using thin liners, another object of the invention is to reduce the distance between the cylinder axes and consequently the overall size of the engine for a given maximum gas pressure. A further object is to provide a sealing device of this kind which does not require the presence of a separate cylinder head gasket and which can therefore as a general rule be reused after removal of the cylinder head.

To this end, the sealing device defined in the preamble is essentially characterized in accordance with the invention in that
the outside surface of the liner is part of a cylindrical, preferably circular cross-section surface with generatrices parallel to the axis of the cylinder at least over the upper major part of its length;
said liner is thin in the sense that it can be deformed by the compression force exerted by said clamping studs;
the liner is compressed axially over at least the major part of its length directly between the cylinder head and a circular lower bearing surface formed in the cylinder block;
the height of the liner before the cylinder head is clamped down is such that when the cylinder head rests before it is clamped down on the upper surface of the liner in turn resting on the lower bearing surface of the cylinder block, there remains an excess height between the bearing surfaces of the cylinder head and the cylinder block, the excess height being sufficiently small that when the cylinder head is clamped down it bears directly on the cylinder block without any of the materials of the cylinder head, the liner and the cylinder block reaching its limit of elastic deformation, with a bearing force greater, given the thickness of the liner, than the maximum force exerted by the gas pressure on the cylinder head but sufficiently high for contact between the liner and the cylinder head to be maintained at all times during operation of the machine.

Preferably, the outside diameter of the liner before the cylinder head is clamped down is such in relation to the diameter of the bore formed in the cylinder block that after the cylinder head is fitted and clamped down using the studs until direct bearing engagement of the cylinder head on the upper surface of the cylinder block is obtained the liner is applied radially to the surface of the bore with a sufficiently low pressure, given the coefficients of friction, to enable small movements of the liner in the axial direction in said bore due to deformation of the cylinder head or differential thermal expansion phenomena.

When position expressions such as "upper" and "lower" are used herein it is assumed that the reciprocating machine is situated so that its cylinder is vertical and closed at the top by the cylinder head. The machine can be used in any position, of course.

The cylinder liner in accordance with the invention is therefore thin and in operation is clamped in a bore machined in the cylinder block. It does not have the usual flange and is sandwiched over all or at least the major part of its length to provide, after the cylinder head is clamped down, the gas seal directly, without requiring the insertion of a separate cylinder head gasket.

Other features of the invention will emerge from the following description of embodiments thereof illustrated by the appended drawings.

FIGS. 1 and 2 of these drawings show in partial radial cross-section a sealing device in accordance with the invention respectively before and after the cylinder head is clamped down.

FIG. 3 shows the same device in transverse cross-section on the line III—III in FIG. 2.

FIG. 4 shows a detail from FIG. 3 to a larger scale to show the deformation of the cylinder liner at a cooling liquid groove.

FIGS. 5 and 6 are diagrams showing deformation of the cylinder liner and the cylinder head.

FIGS. 7 and 8 are views similar to that of figure 2 showing the differences between the invention and the prior art.

FIG. 9 is a diagrammatic view in transverse cross-section showing deformation of the cylinder liner.

FIG. 10 is a variation on FIG. 3.

FIGS. 11 and 12 are views respectively similar to those of FIGS. 1 and 2 but showing an alternative embodiment.

Referring to FIGS. 1 through 3, the invention concerns a sealing device between the cylinder head 1 and the cylinder 2 of a reciprocating pressurized gas machine wherein the gas is contained in a variable volume working chamber 3 delimited inside a cylinder 2 formed in a cylinder block 4 by a cylinder head 1 clamped against the cylinder block 4 by clamping studs 5 in the latter and by a piston sliding with a reciprocating motion in the cylinder 2. The piston carries sealing rings as defined above and each stud 5 carries a nut 6. It has not been deemed necessary to represent the reciprocating machine itself or the piston with its sealing rings as these members are not directly related to the invention and are well known to specialists in the art.

The cylinder 2 is formed by a removable cylinder liner 7 which is sleeved into a bore 8 formed in the cylinder block 4.

According to the invention, the outside surface 19 of the cylinder liner 7 is part of a cylindrical surface of preferably circular cross-section with generatrices parallel to the axis of the cylinder 2 at least over the upper major part of its length, in particular over at least three-quarters of its length, and preferably over all of its length as shown in FIGS. 1 and 2. The cylinder liner 7 is thin (in other words its thickness e is small) in the sense that it can be deformed (as explained later) by the compression force exerted by the clamping studs 5 and that it is generally incapable of its own accord of containing the maximum forces due to the pressure of the gas contained in the working chamber 3. The liner 7 is compressed axially, over at least the major part of its length, directly between the lower surface 9 of the cylinder head 1 and a circular lower bearing surface 10 formed in the cylinder block 4. The upper and lower edges of the liner 7, the bearing surface 10 and the part of the lower surface 9 of the cylinder head 1 against which the upper edge of the liner 7 bears are as flat as possible to seal the respective areas of contact between them.

Referring to FIGS. 1 and 5, the height L of the liner 7 before the cylinder head 1 is clamped down (the situation shown in FIGS. 1 and 5) is such that when the cylinder head 1 is resting before it is clamped down on the upper surface of the liner 7 in turn resting on the lower bearing surface 10 of the cylinder block 4 there remains a distance h called the "excess height" between the bearing surfaces of the cylinder head and of the cylinder block, this excess height h being sufficiently small that when the cylinder head 1 is clamped down it comes into direct bearing contact with the cylinder block 4 (the situation shown in FIG. 2) without any of the materials of the cylinder head 1, the liner 7 and the cylinder block 4 reaching its limit of elastic deformation, with a bearing force greater than, given the thickness e of the liner 7, the maximum force exerted by the pressure of the gas on the cylinder head 1, but sufficiently high for the contact between the liner 7 and the cylinder head 1 to be maintained continuously over all of the periphery of the upper bearing surface of the liner 7 so as to maintain the seal at all times when the machine is operating.

In the embodiment shown in FIGS. 1 and 2 it is assumed that the lower surface of the cylinder head 1 is entirely flat so that the excess height h is equal to the difference, before the cylinder head is clamped down, between the height L of the liner 7 and the distance L' between the plane 11 on which the cylinder head 1 bears on the cylinder block 4 and the plane of the lower bearing surface 10 of the liner 7; it goes without saying, however, that the lower surface of the cylinder head 1 could be other than entirely flat, for example having a centering boss 18 (FIGS. 11 and to receive the upper ends of the liner 7, as shown in FIGS. 11 and 12, in which case the excess height h would not be equal to said difference.

Finally, the outside diameter (D+2e) of the liner 7 before the cylinder head 1 is clamped down (D being its inside diameter) in relation to the diameter D* of the bore 8 is such that, following assembly and clamping by means of the studs 5 until direct contact is achieved between the cylinder head and the cylinder block 4 (FIG. 2), the liner 7 is applied radially to the surface of the bore 8 with a sufficiently low pressure, given the relevant coefficient of friction, to enable very small axial movements of the liner 7 in the bore 8 caused by deformation of the cylinder head 1 or differential thermal expansion phenomena.

The reciprocating machine is preferably liquid cooled. To this end openings are advantageously provided at the interface of the outside of the liner 7 and the surface of the bore 8 to enable the cooling liquid to flow therein. Said openings are preferably axial grooves 12 equi-angularly distributed in the circumferential direction and advantageously vault-shaped.

In the preferred embodiment shown in FIGS. 1 through 3 the grooves 12 are formed in the cylinder block 4, the outer surface of the liner 7 being smooth. In the lower part of the liner 7 these grooves 12 communicate with a cooling liquid manifold groove 13 formed in the cylinder block 4. In the upper part of the liner 7 they communicate with a manifold groove 14 formed in the cylinder head 1. An 0-ring 15 (not shown in FIGS. 1 and 2) preferably provides a cooling liquid seal.

The rules set out above will enable specialists in the art to determine the dimensions of the liner 7 as will now be explained by way of example only.

1 - Definition of magnitudes

| | |
|---|---|
| Height of the liner 7 before clamping, characterized by the distance between the upper bearing engagement with the cylinder head and the lower bearing engagement with the cylinder block: | L |
| Excess height: | h |
| Thickness of the liner 7 before clamping: | e |
| Inside diameter of the liner 7 before clamping: | D |
| Maximum gas pressure in the chamber 3: | $(P_f)_{max}$ |
| Stud clamping force: | $F_G$ |

2—Determination of the excess height h 2.1 The studs clamp the cylinder head in direct contact with the cylinder block. The liner is therefore compressed by the amount h which produces a compression stress $\sigma_c$ which must be less than a limit one preventing each material clamped (i.e. the materials of the cylinder head, the liner and the cylinder block) from deforming plastically, i.e. permanently:

$$\sigma_c = E \cdot (h/L) < \sigma_e, \text{ i.e. } h < L \cdot \sigma_e / E$$

E: Young's modulus of the liner material.
With E=21 000 hbars (steel) and a limit stress of 30 hbars:

$$h/L < 0.00143$$

2.2 The cylinder head must be held in direct contact with the cylinder block under all operating conditions of the machine.

To achieve this it is sufficient for the force $(Fa)_O$ with which the cylinder head is clamped to the cylinder block when the machine is stopped to be at least equal to the maximum force exerted on the cylinder head by the gas pressure, which is given by the following equation for a single-cylinder machine:

$$(Fa)_O > (P_f)_{max} \cdot \pi \cdot D^2 / 4.$$

The bearing force when the machine is stopped is given by the equation:

$$(Fa)_O = F_G - \sigma_C \cdot \pi \cdot e \cdot (D+e)$$

or:

$$(Fa)_O = F_G - (h/L) \cdot E \cdot \pi \cdot e \cdot (D+e)$$

The previous condition is therefore expressed in the form:

$$\frac{h}{L} \leq \frac{4F_G/\pi \cdot D^2 - (P_f)_{max}}{4E \cdot e/D \cdot (1 + e/D)}$$

Numerical example:

| | |
|---|---|
| $F_G =$ | 100 000 daN |
| $(P_f)_{max} =$ | 300 bars |
| $E =$ | 21 000 bars |
| $e =$ | 5 mm |
| $D =$ | 135 mm |
| h/L < 0.00124, which is compatible with the previous limit. | |

2.3 On the other hand, the excess height h must be sufficiently large to be able to compensate for:
cyclic deformation of the cylinder head during operation of the machine (generally a few hundredths of a millimeter),
differences in the liner height L in the case of a multi-cylinder machine with a monobloc cylinder block so that the liner bears on the cylinder head at the top at all times to prevent any loss of seal.

The benefit of compressing the liner over the major part of its height, which achieves the maximum spring back, is evident:
if, for example, h/L<0.001 (which satisfies the previous two limits) and L=250 mm, then h=0.25 mm, which value is more than sufficient to compensate any deformation and manufacturing variations between liners with reasonable (and therefore economic) tolerances.

On the other hand, if the liner is compressed only at the flange as is the case ordinarily (FIG. 8), the spring back is insufficient and this requires a different and much more constraining cylinder head-cylinder liner-cylinder block assembly.

3—Determining the thickness of the liner 7

The thickness e of the liner 7 must be a small as possible to minimize the distance between the cooling liquid and the inside surface of the liner 7 exposed to the hot gas, such as the combustion gas in an internal combustion engine. However, the thickness must be sufficiently large to prevent excessive deformation of the liner by the gas pressure, in particular when grooves 12 are formed within the bore 8, in the cylinder block 4 and/or in the thickness of the liner itself (as described hereinafter with reference to FIG. 10) to enable the cooling liquid to flow in direct contact with the liner-cylinder block interface. There exists a relationship between the thickness e and the width X of the grooves 12 such that the maximum deformation δ of the liner 7 (FIG. 4) due to the gas pressure is less than 1 micrometer, that is to say less than the thickness of the oil film between the piston sealing ring or rings and said liner 7. In this way a seal is provided at the piston at all times.

To satisfy this condition the ratio between the thickness e of the liner and the width X of the grooves will preferably be near unity for steel and higher for materials softer than steel.

For example, with a steel liner having a thickness of 5 mm and an outside diameter of 145 mm, 44 grooves could be provided each 5 mm wide and 10 mm deep. A cast iron liner would be 7 mm thick for the same spacing of the grooves. With a maximum gas pressure of 300 bars, the transverse deformation of the liner is in the order of 0.5 micrometer, which is very much less than the thickness of the oil film. A seal is therefore provided at the piston at all times.

4—Clamping the liner 7

As already explained, when it has been fitted into the bore in the cylinder block (FIG. 1) the liner 7 is compressed until the bearing surface of the cylinder head 1 comes into direct contact with the bearing surface of the cylinder block 4 (FIG. 2).

Compression of the liner increases its diameter until it comes into contact with the inside surface of the bore in the cylinder block, clamping the liner into the cylinder block.

However, this clamping must not be so severe, given the coefficient of friction between the liner and the cylinder block, as to prevent small axial movements of the liner to ensure permanent contact between the upper bearing surface of the liner and the cylinder head despite cyclic deformation of the cylinder head resulting from the pressure of the gas and from differential thermal expansion phenomena (as schematically shown at m in FIG. 6).

If the liner is clamped too tightly into the cylinder block, to the extent that it is immobilized in the axial direction, there would be a risk of losing the axial bearing engagement between the liner and the cylinder head, causing defective sealing at the cylinder head/liner interface.

In practice a cold diametral clearance in the order of 0.0002 mm is used which produces a sufficiently weak clamping action after the cylinder head is clamped down to enable the liner to follow small movements due to the cyclic deformation of the cylinder head.

The sealing device in accordance with the invention had numerous advantages, the main ones of which will be described hereinafter.

According to the invention, the liner 7 and the cylinder head gasket form a single component, as shown in FIG. 7 in particular, whereas in prior art constructions (see, for example, U.S. Pat. No. 2 721 542 and GB-A-2 088 949 or equivalents U.S. Pat. No. 4,385,595) a separate cylinder head gasket 16 is used, as shown in FIG. 8.

By virtue of its great height, the resilient sealing element in accordance with the invention (the liner 7) is compressed once and for all when it is fitted and is not subject to fatigue stresses.

The cylinder head 1 and the cylinder block 4 are massive and rigid parts and are always in bearing engagement. The length of the liner 7 remains constant so that the liner is not subject to fatigue cycles This distinguishes the invention from prior art cylinder head gaskets:

The conventional cylinder head gasket 16 (FIG. 8) is thin (a few millimeters thick). It therefore has no spring back. Given the elasticity of the material of the cylinder head gasket, the compression-expansion capability of a conventional cylinder head gasket 16 is in the order of a few micrometers although deformation of the cylinder head due to the pressure of the gas can exceed 10 micrometers. Due to this lack of spring back in the sealing member (the cylinder head gasket 16) it is not possible to apply the cylinder head 1 to the cylinder 4 to take up the traction force of the studs 5. If the deformation of the cylinder head (>10 μm) is greater than the spring back of the gasket (~1-2 μm) contact is lost and leaks result.

Consequently, the conventional cylinder head gasket 16 is sandwiched between the cylinder head 1 and the cylinder block 4 and therefore absorbs variations in contact pressure due to variations in the pressure of the gas in the working chamber 3: it is therefore subject to fatigue stress which leads to problems of ageing and thus of sealing.

On the contrary, the liner 7 in accordance with the invention, being compressed resiliently—with a high spring back because of its height—is capable of compensating non-circular deformation of the cylinder head 1.

Each generatrix of the resilient thin liner 7 behaves like a compressed spring capable of being compressed and expanding independently of the adjacent generatrices. The liner is therefore capable of compensating "non-circular" deformation, by which is meant deformations of non-uniform amplitude at the same distance from the liner axis.

This situation is routinely encountered in a cylinder head clamped down by a limited number of studs (four studs, for example, in FIG. 9), where the clamping force is correct near the boss on which the nut 6 on the stud 5 bears and reduced between the studs 5. The resulting sealing defects are well known to the man skilled in the art.

FIG. 9 shows by means of circular arcs A the areas of good clamping between which potential leakage areas appear.

This aspect is undoubtedly the most important feature of the invention.

On the other hand, if the cylinder head/cylinder block flange 17 (FIG. 8) is rigid—because of its thickness—it cannot compensate "non-circular" deformation of the type described above. This is the case with most cylinder head gaskets used at present.

The liner 7 in accordance with the invention being thin and clamped against the massive and substantially isothermal cylinder block 4, its exterior geometry remains cylindrical irrespective of its temperature and because it is thin its interior geometry is virtually unaltered by temperature changes. It follows that there is no conicity of the liner 7 due to thermal expansion as is observed with thicker liners. The piston/liner seal is improved by this lack of conicity.

The invention is not limited to the embodiment described hereinabove and shown but encompasses all variants thereof that may suggest themselves to specialists in the art. In particular, instead of forming grooves 12 in the cylinder block 4 for the cooling fluid it is possible to bore the cylinder block with circular cylinders and to form the grooves in the thickness of the liner 7, as schematically shown in FIG. 10. The preferred vault shape of the grooves 12 enables further reduction in the distance between the cooling liquid and the surface of the liner 7 exposed to the combustion gases.

I claim:

1. Sealing device between the cylinder head (1) and the cylinder (2) of a reciprocating pressurized gas machine in which the gas is contained in at least one variable volume working chamber (3) delimited inside a cylinder (2) formed in a cylinder block (4) by a cylinder head (1) clamped against the cylinder block (4) by clamping studs (5) therein and by a piston sliding with a reciprocating movement in said cylinder (2), which sealing device is formed by a removable cylindrical liner (7) which is sleeved into a bore (8) provided in said cylinder block (4), the piston being provided with sealing rings in contact with the inside wall of the liner (7), characterized in that the outside surface (19) of the liner (7) is part of a cylindrical, preferably circular cross-section surface with generatrices parallel to the axis of the cylinder (2) at least over the upper major part of its length;

said liner (7) is thin in the sense that it can be deformed by the compression force exerted by said clamping studs (5);

the liner (7) is compressed axially over at least the major part of its length directly between the cylinder head (1) and a circular lower bearing surface (10) formed in the cylinder block (4);

the height (L) of the liner (7) before the cylinder head (1) is clamped down is such that when the cylinder head rests before it is clamped down on the upper surface of the liner (7) in turn resting on the lower bearing surface (10) of the cylinder block (4) there remains an excess height (h) between the bearing surfaces of the cylinder head (1) and the cylinder block (4), the excess height (h) being sufficiently small that when the cylinder head (1) is clamped down it bears directly on the cylinder block (4) without any of the materials of the cylinder head (1), the liner (7) and the cylinder block (4) reaching its limit of elastic deformation, with a bearing force greater, given the thickness (e) of the liner (7), than the maximum force exerted by the gas pressure on the cylinder head (1) but sufficiently high for contact between the liner (7) and the cylinder head (1) to be maintained at all times during operation of the machine.

2. Sealing device according to claim 1 characterized in that the outside diameter of the liner (7) before the cylinder head (1) is clamped down is such in relation to the diameter of the bore (8) formed in the cylinder block (4) that after the cylinder head (1) is fitted and clamped down using the studs (5) until direct bearing engagement of the cylinder head (1) on the upper surface of the cylinder block (4) is obtained the liner (7) is applied radially to the surface of the bore (8) with a sufficiently low pressure, given the coefficients of friction, to enable small movements of the liner (7) in the axial direction in said bore (8) due to deformation of the cylinder head (1) or differential thermal expansion phenomena.

3. Sealing device according to claim 1 characterized in that the machine is liquid-cooled.

4. Device according to claim 3 characterized in that the outside surface of the liner (7) is bathed in the cooling liquid by virtue of openings formed at the interface between the outside surface of the liner (7) and the surface of the bore (8) in the cylinder block (4).

5. Sealing device according to claim 4 characterized in that said openings are axial grooves (12) equi-angularly distributed in the circumferential direction on the cylinder block (4), the outside surface of the liner (7) being smooth.

6. Sealing device according to claim 4 characterized in that said openings are axial grooves (12) equi-angularly distributed in the circumferential direction on the liner (7), the surface of the bore (8) being smooth.

7. Sealing device according to claim 5 characterized in that the ratio between the maximum width (X) of the grooves (12) and the thickness (e) of the liner (7) is close to unity for a steel liner (7) and higher for a liner (7) made from a material softer than steel.

8. Sealing device according to claim 4 characterized in that the grooves (12) are vault-shaped.

9. Sealing device according to claim 1 characterized in that the machine is an internal combustion engine.

10. Device according to claim 1 characterized in that the liner 7 is sufficiently thin to be incapable of its own accord of containing the maximum forces exerted by the gas contained in the working chamber (3).

* * * * *